(12) United States Patent
Maekawa

(10) Patent No.: US 8,941,748 B2
(45) Date of Patent: Jan. 27, 2015

(54) IMAGING SYSTEM, IMAGING APPARATUS, CONTROL METHOD THEREOF, AND STORAGE MEDIUM FOR IMPROVING COLLECTION EFFICIENCY OF IMAGE DATA

(75) Inventor: Koji Maekawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 599 days.

(21) Appl. No.: 13/205,175

(22) Filed: Aug. 8, 2011

(65) Prior Publication Data

US 2012/0050549 A1 Mar. 1, 2012

(30) Foreign Application Priority Data

Aug. 30, 2010 (JP) ................ 2010-192709

(51) Int. Cl.
| | | |
|---|---|---|
| H04N 5/232 | (2006.01) | |
| H04N 5/247 | (2006.01) | |
| H04N 1/00 | (2006.01) | |
| H04N 1/32 | (2006.01) | |
| H04N 1/327 | (2006.01) | |

(52) U.S. Cl.
CPC ........... *H04N 5/247* (2013.01); *H04N 1/00153* (2013.01); *H04N 1/00172* (2013.01); *H04N 1/32101* (2013.01); *H04N 1/32773* (2013.01); *H04N 5/23203* (2013.01); *H04N 2201/3202* (2013.01); *H04N 2201/3205* (2013.01); *H04N 2201/3214* (2013.01); *H04N 2201/3215* (2013.01); *H04N 2201/3226* (2013.01); *H04N 2201/3253* (2013.01); *H04N 2201/3274* (2013.01)
USPC .................................................... 348/211.99

(58) Field of Classification Search
USPC ............... 348/211.99, 211.1, 211.3, 211.11, 348/211.14
See application file for complete search history.

(56) References Cited

U.S. PATENT DOCUMENTS

| | | | | |
|---|---|---|---|---|
| 5,438,356 | A | * | 8/1995 | Ushiki et al. ..................... 725/5 |
| 6,741,276 | B1 | * | 5/2004 | Yonezawa et al. ............ 348/159 |
| 6,983,419 | B1 | * | 1/2006 | Yonezawa et al. ............ 715/722 |
| 7,222,356 | B1 | * | 5/2007 | Yonezawa et al. ............ 725/105 |
| 7,388,602 | B2 | * | 6/2008 | Inoue et al. ............... 348/207.99 |
| 7,499,084 | B2 | * | 3/2009 | Kurakata ................... 348/231.2 |
| 2004/0001631 | A1 | * | 1/2004 | Camara et al. ................ 382/224 |
| 2004/0109066 | A1 | * | 6/2004 | Inoue et al. ............... 348/207.99 |
| 2005/0193421 | A1 | * | 9/2005 | Cragun ........................... 725/80 |
| 2006/0174203 | A1 | * | 8/2006 | Jung et al. .................... 715/751 |
| 2008/0297608 | A1 | * | 12/2008 | Border et al. ............ 348/207.11 |

FOREIGN PATENT DOCUMENTS

| | | |
|---|---|---|
| JP | 2007-013704 | 1/2007 |
| JP | 2007-174026 | 7/2007 |

* cited by examiner

*Primary Examiner* — Nicholas Giles
(74) *Attorney, Agent, or Firm* — Fitzpatrick, Cella, Harper & Scinto

(57) ABSTRACT

An imaging system in which an image is shared by a first imaging apparatus and a second imaging apparatus which form a network group, the first imaging apparatus comprising a transmission unit adapted to transmit imaging request information to request imaging to the second imaging apparatus; and the second imaging apparatus comprising a reception unit adapted to receive the imaging request information, a switching unit adapted to switch an imaging mode to a request imaging mode when the imaging request information is received, an imaging unit adapted to capture an image in the request imaging mode, a generation unit adapted to generate, based on the imaging request information, imaging information assigned to the image captured by the imaging unit, and a storage unit adapted to store the image captured by the imaging unit and the imaging information generated by the generation unit in association with each other.

13 Claims, 8 Drawing Sheets

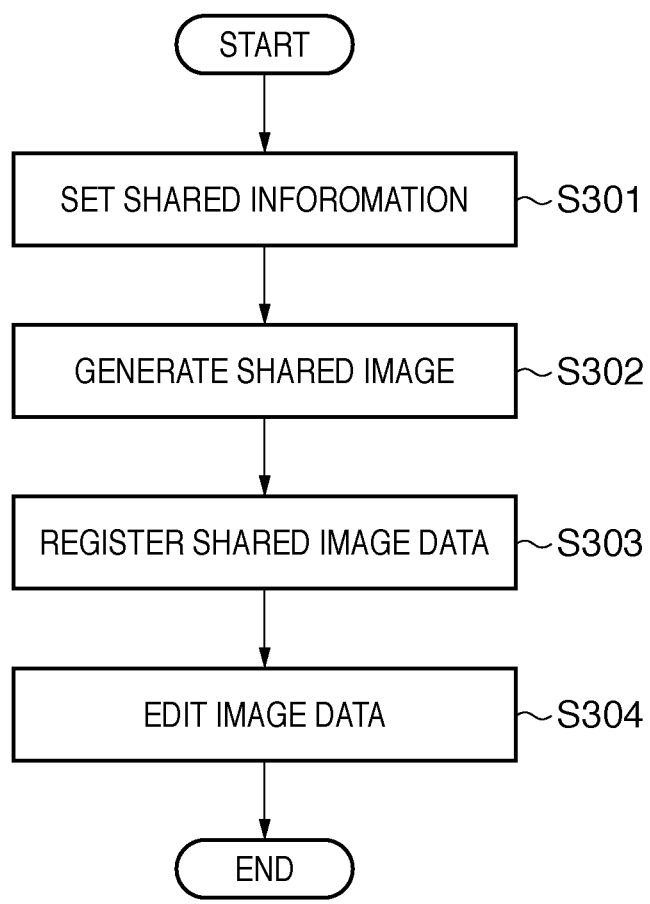

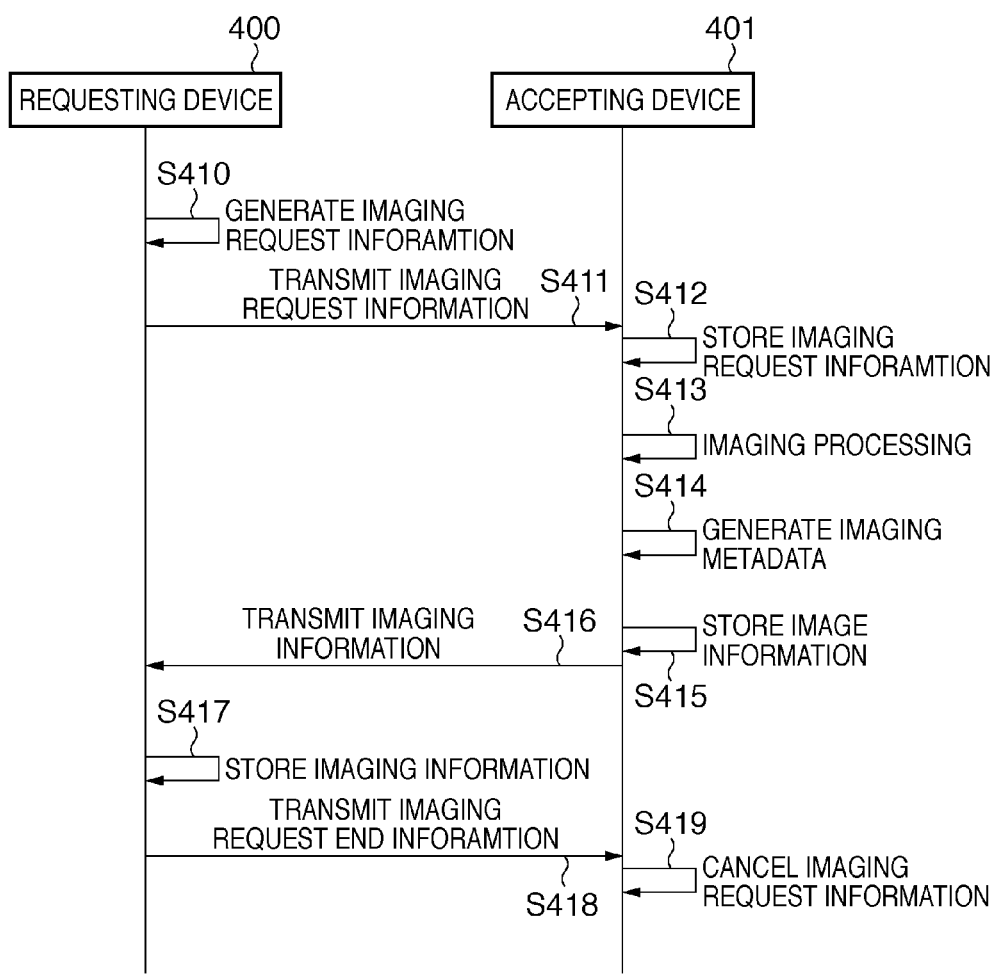

FIG. 5

| INFORMATION NAME | INFORMATION CONTENTS |
|---|---|
| 501 — DIVICE ID | ID01 |
| 502 — ASSIGNED TEXT INFORMATION | BALL TOSS |
| 503 — OBJECT INFORMATION | AUTHENTICATION FEATURE INFORAMTION OF A |
| 504 — OBJECT NAME | A |
| 505 — IMAGING REQUEST START TIME | 10 : 25 |
| 506 — IMAGING REQUEST END TIME | 10 : 45 |
| 507 — REQUEST ID | ID00001 |
| 508 — IMAGING TARGET LOCATION INFORMATION | LATITUDE / LONGITUDE, DIRECTION, RANGE, ETC |
| 509 — IMAGING REQUEST DETERMINATION CONDITION | OFF |

FIG. 6

| INFORMATION NAME | INFORMATION CONTENTS |
|---|---|
| 601 — IMAGING TIME | 10 : 30 |
| 602 — DEVICE ID | ID02 |
| 603 — ASSIGNED TEXT INFORMATION | BALL TOSS |
| 604 — OBJECT NAME | A |
| 605 — REQUEST ID | ID00001 |
| 606 — IMAGING TARGET LOCATION INFORMATION | LATITUDE / LONGITUDE, DIRECTION, RANGE, ETC |

FIG. 7

| IMAGING TIME | DEVICE ID | ASSIGNED TEXT INFORMATION | OBJECT NAME | REQUEST ID | IMAGING TARGET LOCATION INFORMATION | SHARED ID |
|---|---|---|---|---|---|---|
| 10 : 30 | ID02 | BALL TOSS | A | ID00001 | ⋯⋯ | 001 |
| 10 : 31 | ID02 | BALL TOSS | A | ID00001 | ⋯⋯ | 001 |
| 10 : 35 | ID02 | BALL TOSS | ⋯⋯ | ID00001 | ⋯⋯ | 001 |
| 10 : 44 | ID03 | TUG OF WAR | ⋯⋯ | ID00002 | ⋯⋯ | 001 |
|  |  |  |  |  |  |  |

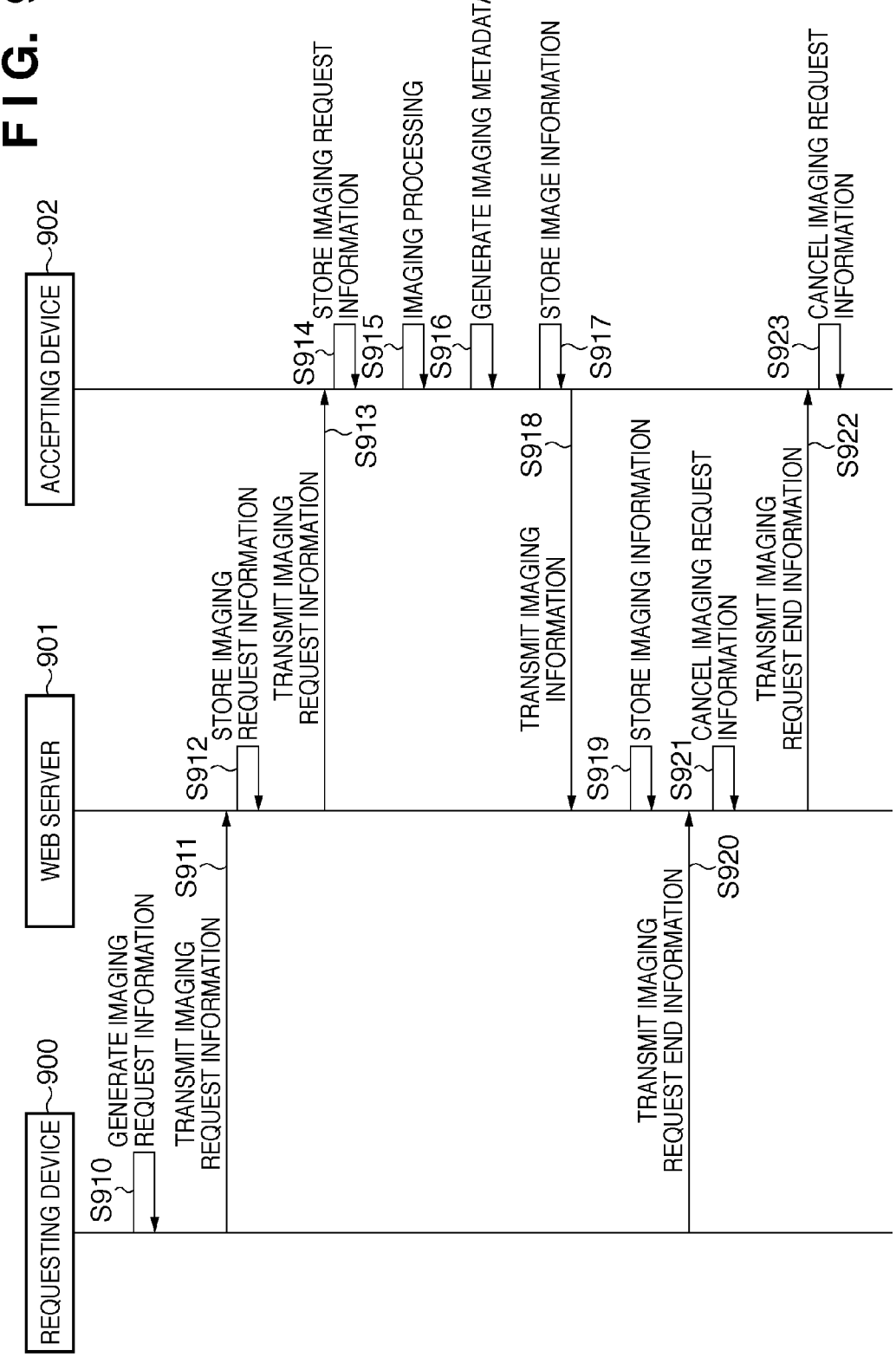

FIG. 10

| INFORMATION NAME | INFORMATION CONTENTS |
|---|---|
| 1001 DIVICE ID | ID01 |
| 1002 ASSIGNED TEXT INFORMATION | BALL TOSS |
| 1003 OBJECT INFORMATION | AUTHENTICATION FEATURE INFORAMTION OF A |
| 1004 OBJECT NAME | A |
| 1005 IMAGING REQUEST START TIME | 10 : 25 |
| 1006 IMAGING REQUEST END TIME | 10 : 45 |
| 1007 REQUEST ID | ID00001 |
| 1008 IMAGING TARGET LOCATION INFORMATION | POINT<br>LATITUDE 35°yy'yy. yyy"<br>LATITUDE 13°xx'x. xxx" |
| 1009 IMAGING REQUEST DETERMINATION CONDITION | ON<br>NO OTHER CONDITIONS |

FIG. 11

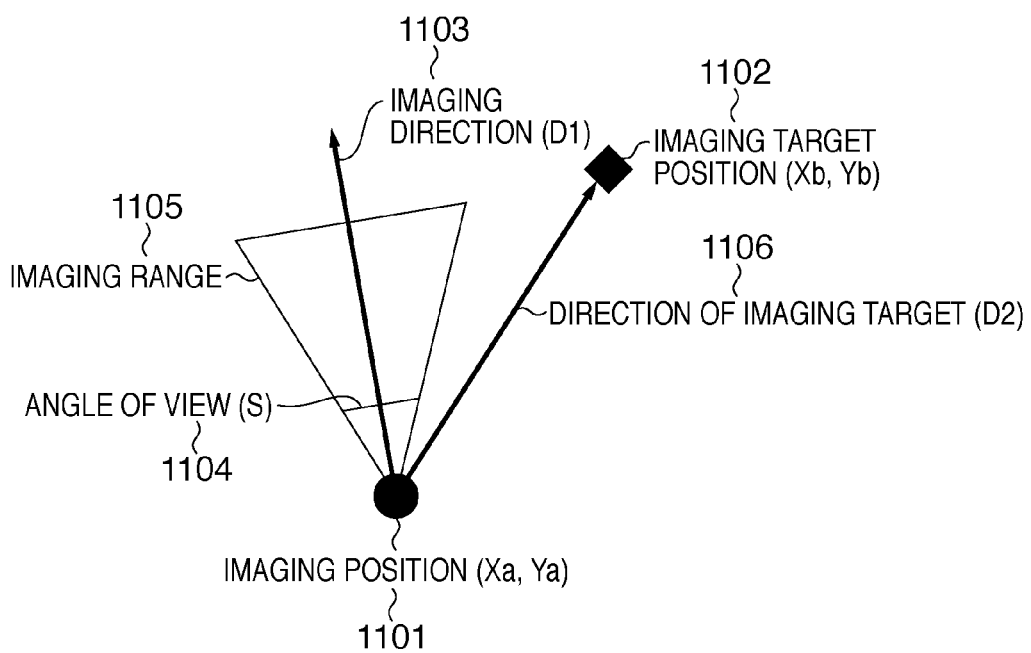

IMAGING SYSTEM, IMAGING APPARATUS, CONTROL METHOD THEREOF, AND STORAGE MEDIUM FOR IMPROVING COLLECTION EFFICIENCY OF IMAGE DATA

BACKGROUND OF THE INVENTION

1. Field of the Invention

The present invention relates to an imaging system, imaging apparatus, control method thereof, and storage medium and, more particularly, to an imaging system for generating image data, an imaging apparatus, a control method thereof, and a storage medium.

2. Description of the Related Art

Conventionally, when image data captured by an imaging apparatus such as a digital camera is shared by a large number of persons, there is as a main stream a method of updating image data to a common server and disclosing the image data to specific users, thereby sharing the image data.

There is also available a method of creating a network group between a plurality of terminals. For example, the two terminals are given as terminal 1 and terminal 2. Terminal 1 requests a data list satisfying a predetermined condition to terminal 2 in the network group. Terminal 2 generates a data list matching the predetermined condition received by the terminal 2 and transmits the data list to first terminal 1. Terminal 1 generates and reproduces a reproduction list from data owned by the self-terminal and the data list owned by the other terminal. Terminal 1 can handle as self-data the data without discriminating its own data from the data owned by the other terminal (for example, Japanese Patent Laid-Open No. 2007-013704).

There is further available a method of creating a network group between imaging apparatuses such as a plurality of digital cameras. For example, two imaging apparatuses are defined as imaging apparatus 1 and imaging apparatus 2. Imaging apparatus 1 transmits as a key object conditions such as features of desired image data to imaging apparatus 2 in the group. Imaging apparatus 2 which has received the key object transmits image data matching the conditions among the images owned by imaging apparatus 2 as a list. The imaging apparatus 1 selects desired image data from the list. Imaging apparatus 1 can acquire the desired image data upon reception of the image data from imaging apparatus 2. The above processing allows imaging apparatus 1 to collect the desired image data from the other imaging apparatus (for example, see Japanese Patent Laid-Open No. 2007-174026).

However, when a network group is generated to share image data, the number of shared image data increases in accordance with the number of shared devices and sharing time. It is difficult to acquire desired image data from a large number of image data. To solve this problem, there is available a method of searching metadata of texts assigned to the shared image data to find the desired data.

However, when the metadata is given as a text, different metadata are assigned to the same image data depending on users. In collecting image data in accordance with the metadata, search omissions may occur. This makes it difficult to collect image data matching all desired conditions.

Assume that desired image data is collected from image data disclosed by a server or the like. In this case, when the desired image data is not disclosed on the server, it is impossible to determine whether this image data exists.

The present invention provides a technique for improving collection efficiency of image data in consideration of the above problem.

SUMMARY OF THE INVENTION

According to one aspect of the present invention, there is provided an imaging system in which an image is shared by a first imaging apparatus and a second imaging apparatus which form a network group, the first imaging apparatus comprising an imaging request information transmission unit adapted to transmit imaging request information to request imaging to the second imaging apparatus; and the second imaging apparatus comprising an imaging request information reception unit adapted to receive the imaging request information transmitted by the imaging request information transmission unit, an imaging mode switching unit adapted to switch an imaging mode to a request imaging mode when the imaging request information is received by the imaging request information reception unit, an imaging unit adapted to capture an image in the request imaging mode, an imaging information generation unit adapted to generate, based on the imaging request information, imaging information assigned to the image captured by the imaging unit, and an imaging information storage unit adapted to store the image captured by the imaging unit and the imaging information generated by the imaging information generation unit in association with each other.

Further features of the present invention will become apparent from the following description of exemplary embodiments with reference to the attached drawings.

BRIEF DESCRIPTION OF THE DRAWINGS

FIG. 3 is a flowchart showing a series of reproduction operations of sharing processing according to the first embodiment;

FIG. 4 is a sequence chart showing the processing sequence for generating shared image data according to the first embodiment;

FIG. 5 is a table for explaining imaging request information according to the first embodiment;

FIG. 6 is a table for explaining imaging information according to the first embodiment;

FIG. 7 is a table for explaining an imaging information list according to the first embodiment;

FIG. 9 is a sequence chart showing the processing sequence for generating shared image data according to the second embodiment;

FIG. 10 is a table for explaining imaging request information according to the second embodiment; and FIG. 11 is a view showing an example of imaging request condition determination processing according to the second embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

The first embodiment will exemplify a method in which a plurality of imaging apparatuses generate a local network group and images are generated in the network group, and a sharing method. More specifically, the first embodiment will exemplify an imaging system in which the first imaging apparatus and the second imaging apparatus constituting the network group share images.

Figure 1:
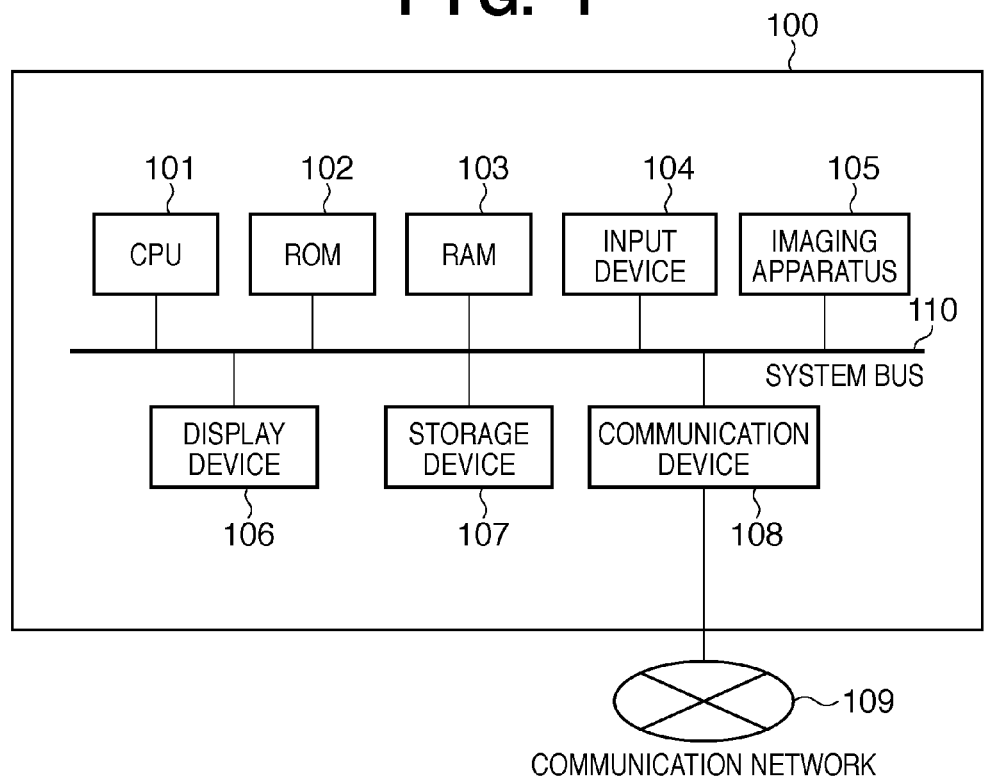
FIG. 1 is a block diagram of an imaging system according to the first embodiment.

The hardware arrangement of an imaging system 100 will be described with reference to FIG. 1. The imaging system 100 comprises a microprocessor CPU (Central Processing Unit) 101, ROM (Read Only Memory) 102, RAM (Random Access Memory) 103, input device 104, imaging apparatus 105, display device 106, memory device 107, and communication device 108. Referring to FIG. 1, the CPU 101 performs arithmetic operations and logical determinations for information processing and controls the constituent components connected to a system bus 110. The ROM 102 is a fixed memory for read only and stores control program codes such as processing programs executed in the present invention. RAM 103 is a rewritable memory and used to temporarily store various kinds of data from the respective constituent components. An imaging request instruction or the like is input from a user to the input device 104. The imaging apparatus 105 captures an image based on the imaging request. The display device 106 comprises, for example, a liquid crystal panel and is used to display the captured image and monitor an imaging target. The storage device 107 stores the captured image and imaging information. A memory card, an HDD (Hard Disk Drive), a DVD-RAM (Digital Versatile Disk Random Access Memory) or the like can be used as a storage medium which stores these data. The communication device 108 can be connected to a plurality of image processing apparatuses via a communication network 109 such as the Internet, a LAN (Local Area Network), or a wireless LAN.

The imaging system comprising the above constituent components controls the imaging apparatus 105 under the imaging conditions input from the communication device 108, executes the processing programs for the captured images under the control of the CPU 101, and performs various kinds of processing such as image information generation, storage, and transmission.

Figure 2:
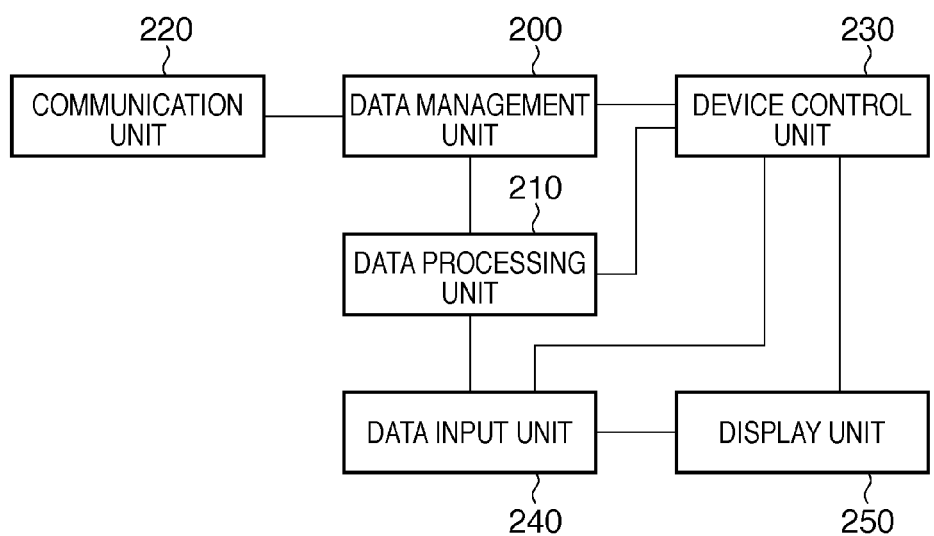
FIG. 2 is a block diagram showing the functions of the imaging system according to the first embodiment.

The functional arrangement of the imaging system 100 will be described with reference to FIG. 2. The imaging system 100 comprises a data management unit 200, data processing unit 210, communication unit 220, device control unit 230, data input unit 240, and display unit 250.

The data management unit 200 performs data management such as management of image sharing group devices, management of imaging request information, management of captured images, and management of imaging information. The data processing unit 210 performs processing for generating captured imaging information based on imaging request information managed by the data management unit 200, request condition determination processing to determine whether the captured image information matches the imaging request conditions, and the like. The communication unit 220 exchanges imaging request information and imaging information generated by the data processing unit 210. The device control unit 230 controls the devices using object information managed by the data management unit 200. The data management unit 200 manages the captured images, and the data processing unit 210 processes them. The display unit 250 displays the group devices managed by the data management unit 200 and monitors the captured images. The data input unit 240 inputs imaging request information from the user, instructs transmission, and selects a device to which the imaging request information is transmitted.

The series of reproduction operations of sharing processing according to the first embodiment will be described with reference to the flowchart in FIG. 3.

In step S301, the CPU 101 sets sharing information. The CPU 101 creates a network group between devices in accordance with an ad hoc wireless technique or a public line and sets shared device information and time information. The CPU 101 may exchange recognition feature information at the time of creation of the network group.

In step S302, the CPU 101 generates a shared image. The CPU 101 assigns metadata to an image captured by the imaging apparatus 105, and performs sharing settings for the network group set in step S301, and generates the captured image as a shared image. The details of shared image generation processing will be described with reference to FIG. 4.

In step S303, the CPU 101 registers the shared image data. The CPU 101 registers the image data generated as the shared image in step S302 as shared image data in the group in a common server, a distributed server, or a storage device in the device.

In step S304, the CPU 101 edits the shared image.

The shared image stored in the common server, distributed server, or the memory device in the device can be searched using a metadata and edited. The collected shared image can be edited as needed.

The data flow between the devices when generating a shared image will be described with reference to FIG. 4. The first embodiment will exemplify a case in which in a scene for generating a shared image by setting shared information in an athletic meeting, a given parent whose child participates in a "ball toss" requests another parent to capture the image of the child of the given parent.

In this embodiment, processing for generating image data based on data exchanged between a requesting device 400 which requests imaging and an accepting device 401 which accepts imaging will be described below. This embodiment will exemplify a case in which one accepting device is present for one requesting device. However, a plurality of accepting devices may be present for a plurality of requesting devices.

In step S410, the CPU 101 causes the requesting device 400 to generate imaging request information. The imaging request information sets metadata to be assigned to a request destination device (accepting device 401), feature information for recognizing an object serving as an imaging target, imaging target location information, and the like. The imaging request information can be generated in the device, but may be generated in advance in the PC and stored in the device.

The imaging request information will be described in detail with reference to FIG. 5. The imaging request information includes a device ID 501, assigned text information 502, object information 503, object name 504, imaging request start time 505, imaging request end time 506, request ID 507, imaging target location information 508, and imaging request determination condition 509. Note that all the kinds of information need not be included, but some pieces of information may be omitted or additional information may be further included.

The device ID 501 is the device ID of the requesting device 400 which is set in advance as a unique ID in the network group. This allows to transmit imaging information to the device corresponding to the designated device ID.

The assigned text information 502 is information representing a text which is desired to be assigned to an image. When a currently requested event is the "ball toss", the "ball toss" is set as the assigned text. Text information as the "ball toss" can be commonly assigned as metadata to the images captured by all the request destination imaging devices.

The object information 503 is feature information of an object serving as a recognition target. In this embodiment, since a given parent wants to image his child (A), the requesting device 400 transmits feature information for recognizing "A" to the accepting device 401. The information to be transmitted can be recognition feature information itself, but may be information which designates the recognition feature information if the recognition feature information has already been exchanged when setting the sharing mode.

The object is not limited to a person, but can be a general object such as a plant or animal or a specific scene.

The object name 504 is metadata assigned when an object is authenticated. In this embodiment, since the given parent requests to image his child, he requests the accepting device 401 to assign "A" as metadata to the recognized images of "A".

The imaging request start time 505 is information which sets time to validate imaging request information. In this embodiment, assume that the imaging request start time is set as 10:25. When the time shared in the network group reaches 10:25, the imaging request information becomes valid in the accepting device 401 which has received the imaging request information. When the imaging request start time is not set, processing for validating the imaging request information at time when the imaging request information is received may be performed.

The imaging request end time information 506 is information which sets time when invalidating the imaging request information. In this embodiment, assume that the imaging request end time is set as 10:45. When time shared by the network group reaches 10:45, the imaging request information is invalidated in the accepting device 401 which has received the imaging request information. When the imaging request end time is not set, the requesting device 400 must send an imaging request end notification at the end time. Upon reception of the imaging request end notification, the imaging request information is invalidated in the accepting device 401.

The request ID 507 is an ID for identifying the imaging request information and is set unique in the network group. This allows to manage a plurality of imaging requests at the same time.

The imaging target location information 508 is position information of the imaging target. For example, the imaging target location information 508 includes latitude information and longitude information, thereby designating the position serving as an imaging target. This embodiment will exemplify a case in which the imaging target location information 508 is not set.

The imaging request determination condition 509 is a condition to determine whether the result matches the request condition. By setting the imaging request determination condition, it can be determined whether an image captured upon the imaging request satisfies the request condition. This embodiment will exemplify a case in which the imaging request determination condition 509 is not set.

Next, in step S411 of FIG. 4, the imaging request information described with reference to FIG. 5 is transmitted from the requesting device 400 to the accepting device 401 (imaging request information transmission processing). That is, the imaging request information generated in step S410 is transmitted to a device constituting the shared group. In addition, a device to be requested can be selected. For example, there is available a method of selecting an imaging device to be requested from the imaging devices in the network group. There are also available a method of selecting an imaging request device in accordance with the type of device (for example, a digital video camera or digital camera), a method of selecting a device to be requested in accordance with the distance of the request destination device from the self-device, and a method of selecting a device to be requested in accordance with the distance from the imaging target position.

In step S412, the accepting device 401 which has received the imaging request information (imaging request information reception processing) stores the received imaging request information in the storage device in the accepting device. The accepting device analyzes and sets the respective pieces of information in the stored imaging request information. The accepting device 401 performs processing for switching the mode to the request imaging mode for imaging upon the request (imaging mode switching processing).

In step S413, the accepting device 401 performs imaging processing. In the imaging processing, the accepting device 401 recognizes the object based on the object information 503 included in the imaging request information, and performs focusing operation for focusing the recognized object and device control such as automatic zoom-in processing of the recognized object. This can support to capture an image in accordance with the imaging request condition.

In step S414, the accepting device 401 generates metadata information to be assigned to the image captured in steps S413.

The metadata information can include, for example, an imaging time, imaging conditions such as an f-number and a shutter speed, and imaging location information such as an imaging position and an imaging direction. When the object is recognized, the contents included in the imaging request information such as the object name are generated as metadata information (imaging information generation processing).

In step S415, the accepting device 401 stores image information by associating the image captured in step S413 with the imaging metadata generated in step S414 (imaging information storage processing).

In step S416, the accepting device 401 transmits the imaging information to the requesting device 400 (imaging information transmission processing). The imaging information is generated by extracting necessary information required to search for captured images from the metadata information generated in step S414. An example of imaging information will be described with reference to FIG. 6. The imaging information includes an imaging time 601, device ID 602, assigned text information 603, object name 604, request ID 605, and imaging target location information 606. All the kinds of information need not be included, but some pieces of the information may be omitted or additional information may be further included.

The imaging time 601 is time when the accepting device 401 captures an image. This imaging time information allows to sort images depending on the time and designate the range. The device ID 602 is information for specifying the imaging device ID set in advance uniquely in the network group. This allows to specify the imaging device which holds the image corresponding to the imaging information on the imaging request side.

The assigned text information 603 is assigned text information 502 included in the imaging request information. The text information as the "ball toss" is commonly assigned as metadata to the images captured upon the current request. The image data can be searched for using the assigned text information 502.

The object name 604 is information set as part of the imaging information when the object requested by the imaging request information can be recognized. The object name 604 allows to determine whether a desired object is present in the captured image. Assuming that the object "A" has been recognized from the currently captured image, "A" is set as the object name 604.

A request ID transmitted using the imaging request information is set in the request ID 605.

The imaging location (latitude and longitude), the imaging direction, and the size (angle of view) of the recognized object are set in the imaging target location information 606.

In addition, in step S417 of FIG. 4, the requesting device 400 receives the imaging information transmitted by the accepting device 401 (imaging information reception processing) and stores the imaging information as an imaging information list (imaging information storage processing).

The imaging information list will be described with reference to FIG. 7. The imaging information list is a list for which the imaging information received from the accepting device to the requesting device 400 is collectively managed. By searching the imaging information list, the imaging information captured by the accepting device 401 in response to the imaging request information can be managed.

In step S418, the requesting device 400 transmits the imaging request end information to the accepting device 401 which has received the imaging request (if a plurality of accepting devices 401 are present, information is transmitted to all the accepting devices 401) (imaging request end information transmission processing). At this time, since the imaging request end time is set in the imaging request information in advance, the imaging request end information need not be transmitted again.

In step S419, when the accepting device 401 receives the imaging request end information from the requesting device 400 (imaging request end information reception processing) or when the imaging request end time set in advance is reached, the accepting device 401 invalidates the stored imaging request information. The accepting device 401 cancels the request imaging mode and sets a status before the imaging request information is received, thus terminating the processing.

As described above, according to this embodiment, the imaging information suitable for search for image data registered in the shared server or distributed server can be collected. In addition, the imaging information of the image captured upon the imaging request can be collected using a small amount of network resource at the time of imaging. All the images captured in response to the imaging request can be grasped.

(Second Embodiment)

Figure 8:
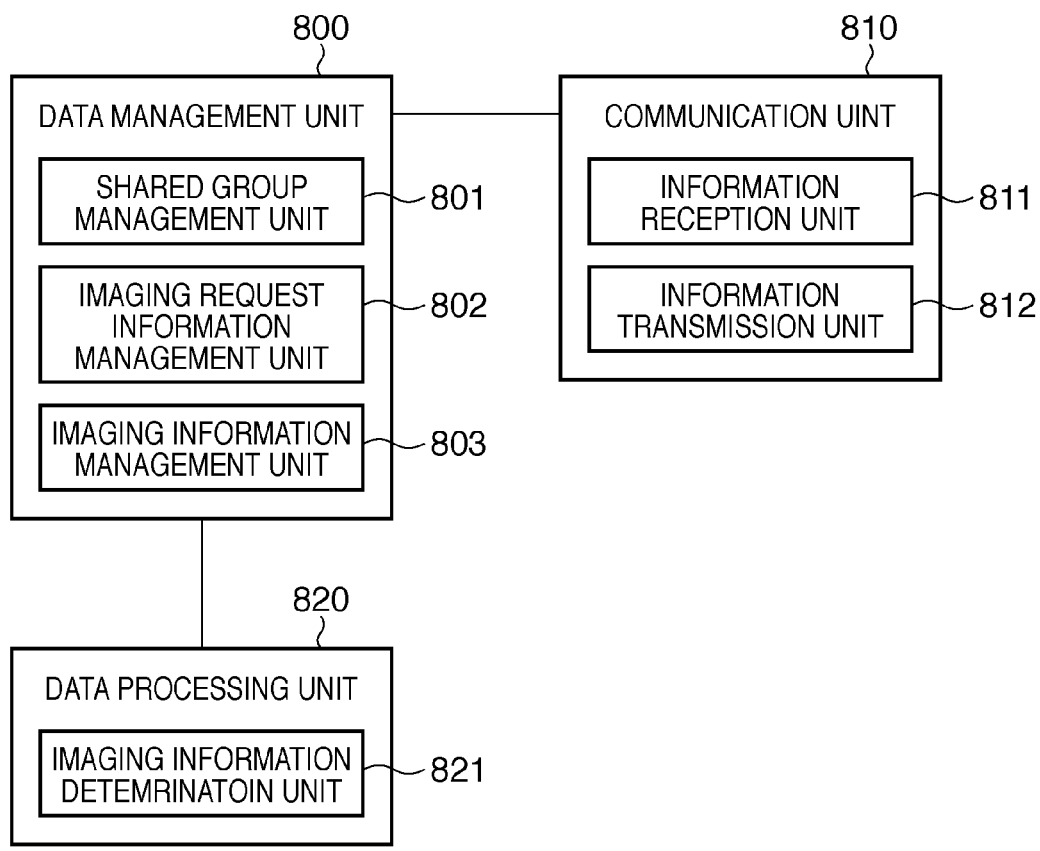
FIG. 8 is a block diagram showing the arrangement of a Web server according to the second embodiment.

The second embodiment will exemplify a case in which the imaging devices do not directly cooperate with each other, but the imaging devices cooperate with each other via an information device such as a PC or server. First of all, the arrangement of a Web server will be described with reference to FIG. 8. The Web server comprises a data management unit 800, communication unit 810, and data processing unit 820. The data management unit 800 comprises a shared group management unit 801, imaging request information management unit 802, and imaging information management unit 803. The communication unit 810 comprises an information reception unit 811 and information transmission unit 812. The data processing unit 820 comprises an imaging information determination unit 821.

The data management unit 800 stores and manages information. The shared group management unit 801 manages the network group. The imaging request information management unit 802 manages the imaging request information transmitted from a requesting device 900 (to be described later with reference to FIG. 9). The imaging information management unit 803 manages the imaging information generated by an accepting device 902 (to be described later with reference to FIG. 9).

The communication unit 810 exchanges information with other devices. The information reception unit 811 receives the imaging request information from the requesting device 400 and receives the imaging information from the accepting device. The information transmission unit 812 transmits the imaging information to the requesting device 900 and transmits the imaging request information to the accepting device 401.

The data processing unit 820 processes the exchanged data. The imaging information determination unit 821 determines imaging information and imaging request information, the transmission destination device of imaging request information, and whether the imaging information is stored. Note that the Web server may manage a plurality of shared groups.

The data flow between the device and the Web server when generating a shared image will be described with reference to FIG. 9. This embodiment will exemplify processing for generating image data between the requesting device 900 which requests imaging, the Web server 901, and the accepting device 902 which accepts the imaging request. This embodiment will exemplifies a case in which one accepting device 902 is present for one requesting device 900. However, the plurality of accepting devices 902 may be present for the plurality of requesting devices 900.

First of all, in step S910, the requesting device 900 generates imaging request information. The imaging request information includes metadata to be assigned by the request destination device, feature information for recognizing an object serving as an imaging target, and an imaging target location. The requesting device 900 transmits in advance the imaging start time and imaging end time to the Web server 901 to allow deletion of image data. The imaging request information can be generated in the device or can be generated by a PC in advance and stored in the device.

The imaging request information according to the second embodiment will be described in detail with reference to FIG. 10. The imaging request information includes a device ID 1001, assigned text information 1002, object information 1003, object name 1004, imaging request start time 1005, imaging request end time 1006, request ID 1007, imaging target location information 1008, and imaging request determination condition 1009. Note that all the kinds of information need not be included, but some pieces of information may be omitted, or additional information may be further included.

The device ID 1001 is identification information of the requesting device set in advance uniquely in the network group. This allows to transmit the imaging information to the designated device ID.

The assigned text information 1002 is a text to be assigned to an image. The current request event is the "ball toss", and the assigned text is set as the "ball toss", so that the text information as the "ball toss" can be commonly assigned as the metadata to the images captured by all the imaging devices to be requested.

The object information 1003 is feature information of an object serving as a recognition target. In this embodiment, since a given parent wants to image his child (A), the requesting device transmits feature information for recognizing "A". The information to be transmitted can be recognition feature information itself, but may be information which designates the recognition feature information if the recognition feature information has already been exchanged when setting the sharing mode.

The object is not limited to a person, but can be a general object such as a plant or animal or a specific scene.

The object name 1004 is metadata assigned when an object is authenticated. In this embodiment, since the given parent requests to image his child, he requests to assign "A" as metadata to the recognized images of "A".

The imaging request start time 1005 is time to validate imaging request information. In this embodiment, assume that the imaging request start time is set as 10:25. When the time shared in the network group reaches 10:25, the imaging request information becomes valid.

The imaging request end time information 1006 is time when invalidating the imaging request information. In this embodiment, assume that the imaging request end time is set as 10:45. When time shared by the network group reaches 10:45, the imaging request information is invalidated.

The request ID 1007 is information which identifies the imaging request information and is set unique in the network group. This allows to manage a plurality of imaging requests at the same time.

The imaging target location information 1008 is information indicating the imaging target position. For example, the imaging target location information includes latitude information and longitude information.

In this embodiment, a position including latitude 35°yy'yy.yyy" and longitude 13x°xx'x.xxx" is designated as the imaging target position. In addition to the method of designating the position using a point as in this embodiment, other various methods such as a method of designating the position using a rectangle and a method of designating the position using a point and range (circle) are available.

The imaging request determination condition 1009 is a condition to determine whether the result matches the request condition. By setting the imaging request determination condition, it can be determined whether an image captured upon the imaging request satisfies the request condition. This embodiment will exemplify a case in which the imaging request determination condition 1009 is set.

The imaging request determination condition 1009 includes a condition for determining whether the area designated by the imaging target position information 1008 is included in the captured image, a condition for determining whether the object information is recognized, and a condition such as the distance between the imaging location and the imaging target location.

In step S911 of FIG. 9, the requesting device 900 transmits the imaging request information to the Web server 901 (request information transmission processing).

In step S912, the Web server 901 which has received the imaging request information stores the imaging request information.

In step S913, the Web server 901 transmits the imaging request information to the accepting device 902 which constitutes the shared group managed in advance by the Web server 901 (second imaging request information transmission processing). When the imaging request information designates a request destination device, the designated accepting device 902 can be selected, and the imaging request information can be transmitted to it. It is possible to designate the transmission destination by a method of selecting a request destination device by the user, a method of selecting the transmission destination by the type of device (for example, a digital video camera or digital camera), a method of selecting the destination device in accordance with the distance from the self-device, or the like.

In step S914, the accepting device 902 which has received the imaging request information (second imaging request information reception processing) stores the received imaging request information in the storage device in the accepting device (imaging request information storage processing). The accepting device 902 which has stored the information analyzes and sets the respective pieces of information in the imaging request information. For example, when the imaging request start time is reached, the processing is performed such that the imaging mode is switched to the request imaging mode.

In step S915, the accepting device 902 performs imaging processing. In the imaging processing, focusing processing for focusing the recognized object and device control such as automatic zoom-in processing on the recognized object are performed based on the object information 1003 included in the imaging request information, thereby supporting to capture images in accordance with the imaging request conditions.

In step S916, the accepting device 902 generates metadata information to be assigned to the images captured in step S915. The metadata information can include, for example, an imaging time, imaging conditions such as an f-number and a shutter speed, and imaging location information such as an imaging position and an imaging direction. When the object is recognized, the contents included in the imaging request information such as the object name are generated as metadata information.

In step S917, the accepting device 902 stores image information by associating the image captured in step S915 with the imaging metadata generated in step S916.

In step S918, the accepting device 902 transmits the imaging information to the Web server 901. As described with reference to FIG. 6, the imaging information contains information such as metadata required for search and information for determining the image matches the imaging request condition.

In step S919, the Web server 901 receives the imaging information transmitted from the accepting device 902 and stores it as the imaging information list.

In this embodiment, since the determination conditions are set in the imaging request information, the Web server 901 determines whether the received imaging information matches the imaging request information.

Whether the received imaging information matches the imaging request conditions will be described with reference to FIG. 11. Coordinates (Xa, Ya) as an imaging position 1101, a direction D1 as an imaging direction 1103, and focal length F are obtained from the imaging target location information 606. The exposure size is given as the product between a height (h) and a width (w), and a diagonal line is given as d, an angle of view 1104 (S) can be given by $$\text{angle of view}(S) = 180/P \times 2 \times \arctan(k/2F)$$

$$[k=(h, w, d)]: P=\text{circular constant} \tag{1}$$

An imaging range 1105 can be calculated as an imaging direction range of (D1)±(S/2). When it is determined whether coordinates (Xb, Yb) as an imaging target position 1102 are included within the imaging range, a direction 1106 (D2) of the imaging target position (1102) is calculated from the imaging position 1101 in equation (2):

$$D2 = 180/P \times \arctan((Xb-Xa)/(Yb-Ya))$$

$$D1 - S/2 \leq D2 \leq D1 + S/2 \qquad (2)$$

When equation (2) holds, the Web server 901 determines that the imaging information matches the imaging request conditions and registers the imaging information in the imaging information list.

In this embodiment, whether the imaging target position 1102 falls within the imaging range 1105 is determined. However, the conditions can include the distance to the imaging target position 1102 or whether the object image is recognized.

In step S920, the requesting device 900 transmits the imaging request end information to the Web server 901 (imaging request end information transmission processing). At this time, since the imaging request end time is set in the imaging request information in advance, the imaging request end time need not be transmitted again in step S920.

In step S921, the Web server 901 which has received the imaging request end information or the Web server 901 whose imaging request end time set in advance reaches invalidates the stored imaging request information and sets all the statuses to the statuses before the imaging request information is received.

In step S922, the Web server 901 which has received the imaging request end information transmits the corresponding imaging request end information to all the accepting devices 902 (second imaging request end information transmission processing).

In step S923, the accepting device 902 which has received the imaging request end information (second imaging request end information reception processing) invalidates the stored imaging request information, cancels the request imaging mode, and sets the statuses to the statuses before the imaging request information is received, thereby terminating the processing.

As described above, according to the second embodiment, the server or the like cooperates with an imaging device to obtain the same effect as described with reference to the first embodiment. Monitoring the network group using the server can create a broader network group. For example, the user can send an imaging request from a remote place such as home to a group imaging device placed at an imaging location. Since the server processes the imaging information, it is unnecessary to determine in real time whether the imaging information is satisfactory, thereby implementing advanced determination processing and more efficiently collecting desired images.

As described above, according to the present invention, in the system in which the plurality of imaging devices capture shared images, a given imaging apparatus sends a desired imaging request condition to another imaging device, metadata requested by the given imaging device can be assigned to an image captured by the other imaging device. For this reason, the collection efficiency of the image data can be improved.

A given imaging device receives an imaging status performed by the other imaging device to which the imaging request from the given imaging apparatus is sent, stores the imaging status as the request imaging status, and compares the collected images and the stored request imaging status, thereby determining whether collection omissions occur. If the collection omissions occur, the given imaging device can request the partner user to upload the corresponding images. In addition, periodical collection processing can also be performed.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-192709 filed on Aug. 30, 2010, which is hereby incorporated by reference herein in its entirety.

What is claimed is:

1. An imaging system in which an image is shared by a first imaging apparatus and a second imaging apparatus which form a network group,
   said first imaging apparatus comprising
   a first transmission unit adapted to transmit imaging request information to request imaging to said second imaging apparatus; and
   said second imaging apparatus comprising
   a reception unit adapted to receive the imaging request information transmitted by said first transmission unit,
   a switching unit adapted to switch an imaging mode to a request imaging mode when the imaging request information is received by said reception unit,
   an imaging unit adapted to capture an image in the request imaging mode,
   a generation unit adapted to generate, using the imaging request information, metadata,
   a storage unit adapted to store the image captured by said imaging unit and the metadata generated by said generation unit in association with each other; and
   a second transmission unit adapted to transmit the metadata generated by said generation unit to said first imaging apparatus,
   wherein said reception unit of said second imaging apparatus further receives a request for a part of images stored in the storage unit from the first imaging apparatus, the images being selected using the metadata.

2. The system according to claim 1, wherein said first imaging apparatus further comprises
   a metadata reception unit adapted to receive the metadata transmitted by said second transmission unit, and
   a storage unit adapted to store the metadata received by said metadata reception unit.

3. The system according to claim 1,
   wherein the image request information includes imaging request start information and imaging request end information, and
   wherein said switching unit starts an image capturing in the request imaging mode based on the imaging request start information, and ends the request imaging mode based on the imaging request end information.

4. The system according to claim 1, wherein the imaging request information includes metadata assigned to the image and feature information indicating a feature of an object serving as an imaging target to authenticate the object.

5. The system according to claim 2,
wherein said first imaging apparatus further comprises a condition determination unit adapted to determine, based on the metadata received by said metadata reception unit, whether an image captured by said imaging unit matches a condition included in the imaging request information, and
wherein said storage unit stores the metadata when said condition determination unit determines condition matching.

6. An imaging system in which an image is shared via a server by a first imaging apparatus and a second imaging apparatus which form a network group,
said first imaging apparatus comprising
a first transmission unit adapted to transmit, to said server, imaging request information for requesting imaging to said second imaging apparatus,
said server comprising
a first reception unit adapted to receive the imaging request information transmitted by said first transmission unit, and
a second transmission unit adapted to transmit the imaging request information to said second imaging apparatus, and
said second imaging apparatus comprising
a second reception unit adapted to receive the imaging request information transmitted by said second transmission unit,
a switching unit adapted to switch an imaging mode to a request imaging mode when said reception unit receives the imaging request information,
an imaging unit adapted to capture an image in the request imaging mode,
a generation unit adapted to generate, using the imaging request information, metadata,
a storage unit adapted to store the image captured by said imaging unit and the imaging information generated by said generation unit in association with each other, and
a second transmission unit adapted to transmit the metadata generated by said generation unit to said server,
wherein said server further
shares and holds images held by said second imaging apparatus, and
receives a request for a part of images stored in the storage unit of said server from the first imaging apparatus, the images being selected using the metadata.

7. The system according to claim 6, wherein said server further comprises
a reception unit adapted to receive the metadata transmitted by said transmission unit, and
a storage unit adapted to store the metadata received by said reception unit.

8. The system according to claim 7, wherein
said first imaging apparatuses further comprises
an imaging request end information transmission unit adapted to transmit imaging request end information to said server,
said server further comprises
an imaging request end information reception unit adapted to receive the imaging request end information transmitted by said imaging request end information transmission unit, and a second imaging request end information transmission unit adapted to transmit the imaging request end information to said second imaging apparatus,
said second imaging apparatus further comprises
a second imaging request end information reception unit adapted to receive the imaging request end information transmitted by said second imaging request end information transmission unit, and
when said second imaging request end information reception unit receives the imaging request end information, said switching unit cancels the request imaging mode.

9. An imaging apparatus comprising:
a reception unit adapted to receive imaging request information transmitted from a server or another imaging apparatus;
a switching unit adapted to switch an imaging mode to a request imaging mode when said reception unit receives the imaging request information;
an imaging unit adapted to capture an image in the request imaging mode;
a generation unit adapted to generate, using the imaging request information, metadata;
a storage unit adapted to store the image captured by said imaging unit and the metadata generated by said generation unit in association with each other; and
a transmission unit adapted to transmit the metadata generated by said generation unit to said server or the other imaging apparatus,
wherein said reception further receives a request for a part of images stored in the storage unit, the images being selected using the metadata.

10. The apparatus according to claim 9, further comprising an imaging request end information reception unit adapted to receive imaging request end information transmitted from said server or the other imaging apparatus,
wherein, when said imaging request end information reception unit receives the imaging request end information, said switching unit cancels the request imaging mode.

11. A method of controlling an imaging apparatus, comprising:
receiving an imaging request information transmitted from a server or another imaging apparatus;
switching an imaging mode to a request imaging mode when the imaging request information is received in the receiving the imaging request information;
capturing an image in the request imaging mode;
generating, using the imaging request information, metadata;
storing the image captured in the capturing the image and the metadata generated in the generating the metadata in association with each other; and
transmitting the metadata generated in the generating to said server or the other imaging apparatus,
wherein said server further
shares and holds images, and
receives a request for a part of images stored in the storing, the images being selected using the metadata.

12. A non-transitory computer-readable storage medium storing a computer program to cause a computer to execute respective steps in a method of controlling the imaging apparatus defined in claim 11.

13. An imaging system in which an image is shared by a first imaging apparatus and a second imaging apparatus which form a network group, said first imaging apparatus comprising
an imaging request information transmission unit adapted to transmit imaging request information to request imaging to said second imaging apparatus; and
said second imaging apparatus comprising
an imaging request information reception unit adapted to receive the imaging request information transmitted by said imaging request information transmission unit,
an imaging mode switching unit adapted to switch an imaging mode to a request imaging mode when the imaging request information is received by said imaging request information reception unit,
an imaging unit adapted to capture an image in the request imaging mode,
an imaging information generation unit adapted to generate, based on the imaging request information, imaging information assigned to the image captured by said imaging unit, and
an imaging information storage unit adapted to store the image captured by said imaging unit and the imaging information generated by said imaging information generation unit in association with each other,
wherein when said second imaging apparatus receives imaging request end information from said first imaging apparatus or when time shared by the network group reaches end time based on end time information included in the imaging request information, said imaging mode switching unit cancels the request imaging mode.

* * * * *